April 30, 1968 T. GASKINS 3,380,231
GRASS CUTTING APPARATUS
Filed Feb. 19, 1965 3 Sheets-Sheet 1
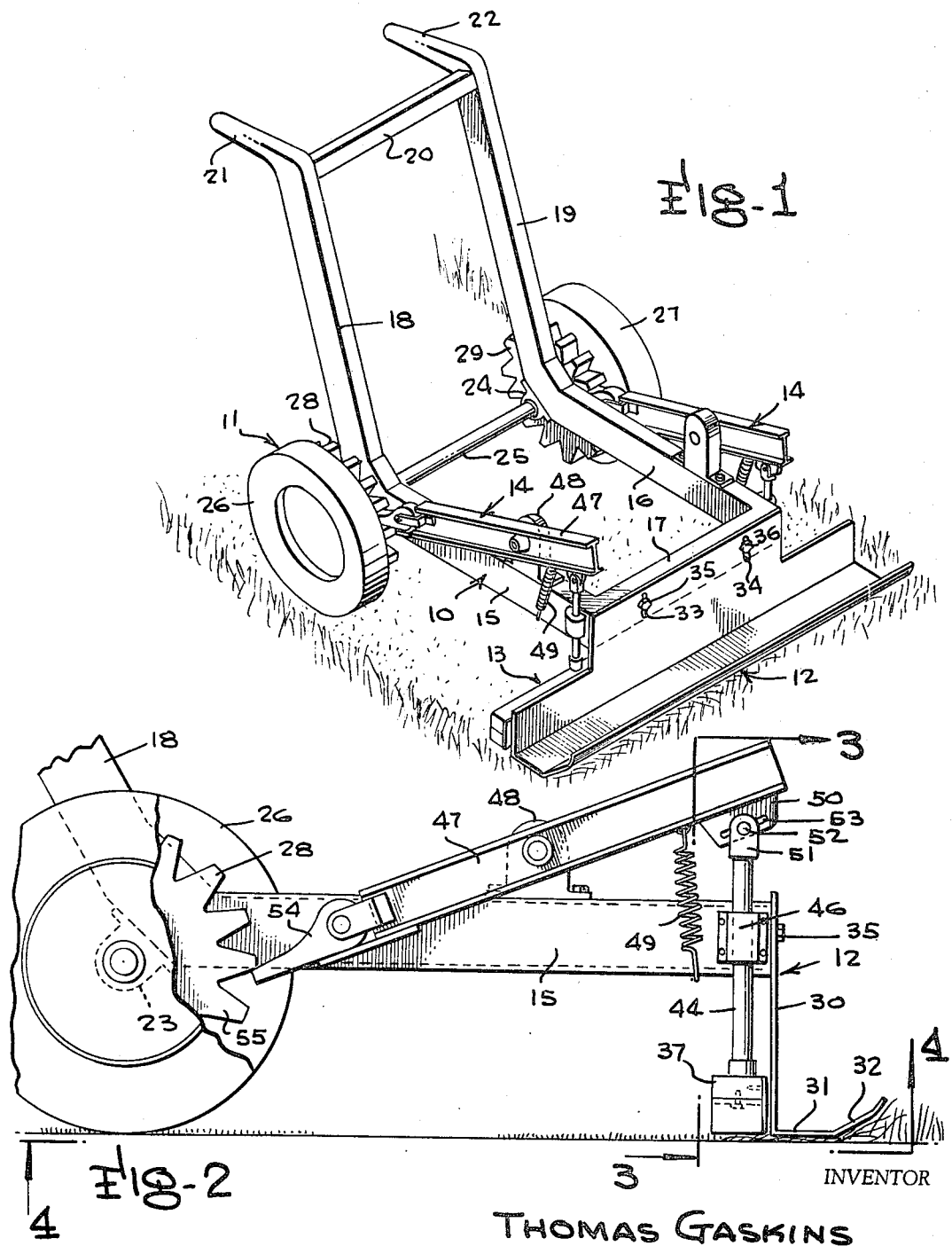
INVENTOR
THOMAS GASKINS
BY Mason, Fenwick & Lawrence
ATTORNEYS

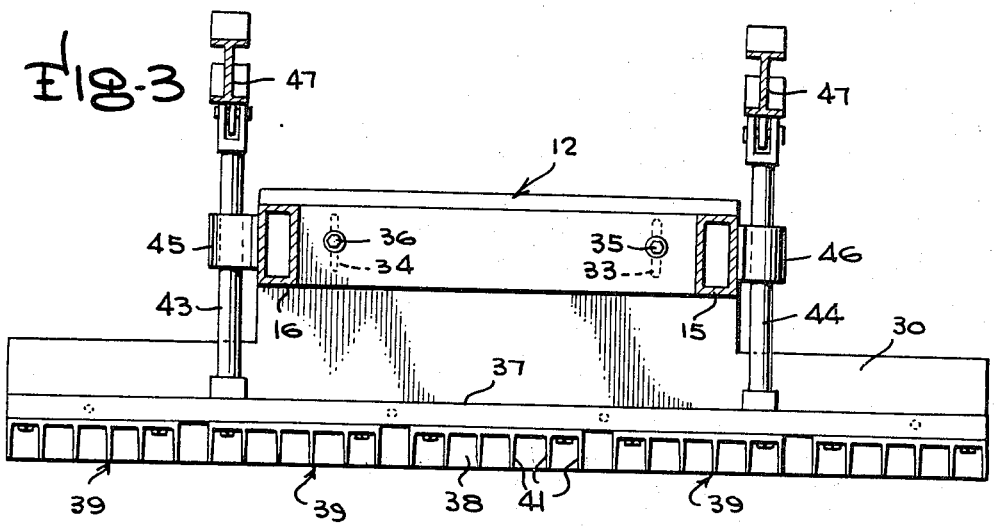
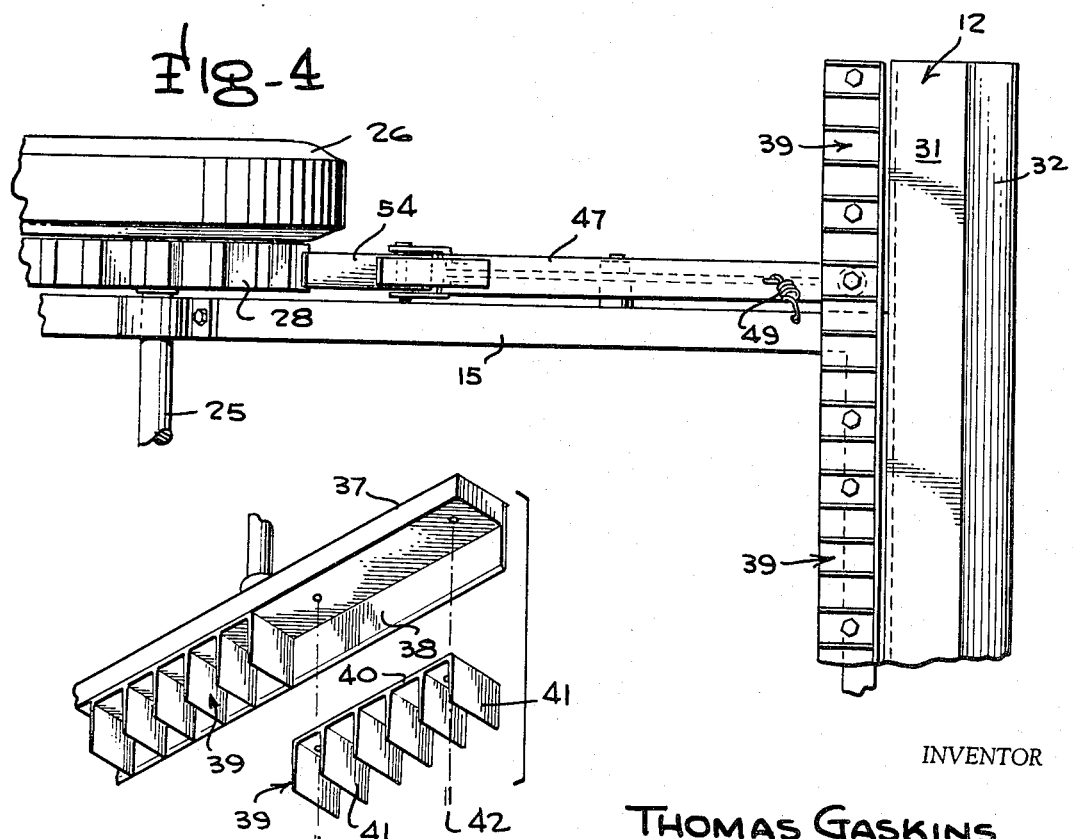

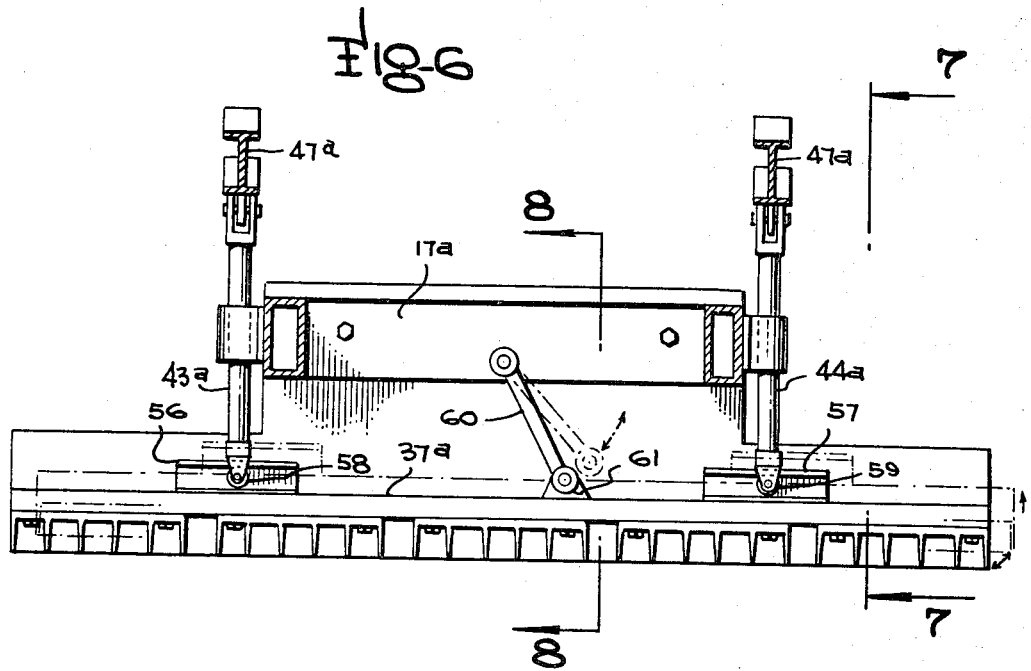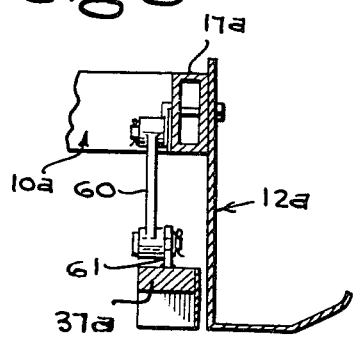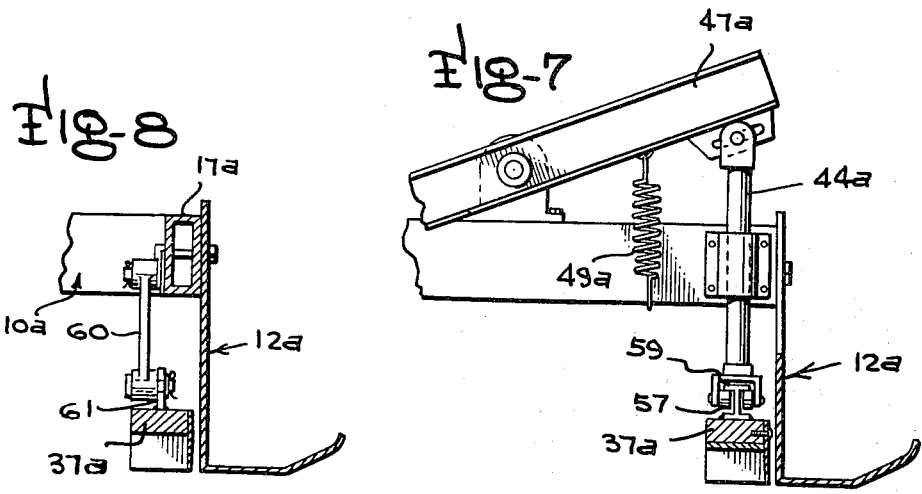

United States Patent Office 3,380,231
Patented Apr. 30, 1968

3,380,231
GRASS CUTTING APPARATUS
Thomas Gaskins, Palmdale, Fla. 33944
Filed Feb. 19, 1965, Ser. No. 434,032
9 Claims. (Cl. 56—26.5)

ABSTRACT OF THE DISCLOSURE

A grass cutter having a tranverse flat bottomed grass engaging and bending member which bends grass to a horizontal position for cutting by a cutting blade simultaneously movable laterally and vertically to engage and cut the grass.

In the prior art most machines for cutting grass are of the reel or rotary blade type. These types of machines have been found to be unsatisfactory in many respects. Usually, such machines require a considerable amount of power to operate and also operate in a manner whereby the blades of grass are disturbed by the rotary motion of the blades. The rotary motion of the blades consequently causes the blades of grass to be oriented in random positions which often are not suitable for the cutting angle of the blades. In addition, often, the rotary motion of the cutting blades of such machines tends to create currents of air, causing soil and other abrasive matter to be drawn up and thrown against the cutting blades, dulling their cutting edges. It further has been found that such prior art grass cutting machines of the rotary blade type often are dangerous to operate, having the tendency to cause injury to the operator.

Accordingly, the principal object of this invention is to provide an improved apparatus for cutting grass.

Another object of this invention is to provide an improved grass cutting apparatus which utilizes reciprocating cutting means.

Another object of this invention is to provide an improved grass cutting apparatus which is adapted to orientate the blades of grass in suitable positions relative to the angle of the cutting blades.

A still further object of this invention is to provide an improved grass cutting apparatus which requires comparatively less power to operate than most conventional grass cutting machines.

Another object of this invention is to provide an improved grass cutting apparatus which operates in a manner whereby soil and other abrasive matter along the working surface of the apparatus does not have the tendency to be thrown against and dull the cutting edges of the cutting means thereof.

A further object of the present invention is to provide an improved grass cutting apparatus which is safe to operate.

A still further object of this invention is to provide an improved grass cutting apparatus which is simple in construction, easy to operate and comparatively inexpensive to manufacture.

Another object of the present invention is to provide a novel method of cutting grass.

Other objects and advantages of the present invention will become more apparent to those persons skilled in the art, from the following description taken in conjunction with the accompanying drawings, wherein:

FIGURE 1 is a perspective view of an embodiment of the invention;

FIGURE 2 is an enlarged side elevational view of the embodiment illustrated in FIGURE 1, having portions thereof broken away;

FIGURE 3 is a cross-sectional view taken along line 3—3 in FIGURE 2;

FIGURE 4 is a cross-sectional view taken along line 4—4 in FIGURE 2;

FIGURE 5 is a perspective view of the cutting means of the embodiment shown in FIGURES 1 through 4, illustrating a portion thereof in exploded ralation;

FIGURE 6 is a vertical cross-sectional view of another embodiment of the present invention;

FIGURE 7 is a cross-sectional view taken along line 7—7 in FIGURE 6; and

FIGURE 8 is a cross-sectional view taken along line 8—8 in FIGURE 6.

Briefly described, the present invention relates to an apparatus for cutting grass generally comprising a movable support means, means mounted on the support means engageable with the blades of grass for bending the blades, reciprocable means mounted on the apparatus adjacent the bending means for cutting the blades of grass and means for reciprocating the cutting means.

Referring to FIGURES 1 through 5 in the drawings, there is illustrated a first embodiment of the invention. This embodiment generally includes a support frame 10 mounted on a wheeled unit 11, a grass engaging and blending member 12 mounted on the front end of the support frame 10, a cutting assembly 13 mounted on the support frame 10 rearwardly and adjacent the bending member 12 and identical mechanism 14, 14 mounted on the support frame 10 and operatively interconnecting the wheeled unit 11 and the cutting assembly 13 for translating the rotary motion of the wheeled unit to reciprocating motion of the cutting means. The support frame 10 includes a pair of laterally spaced side members 15 and 16, a front end member 17, upwardly and rearwardly extending arm members 18 and 19 connected at their upper ends by a cross member 20 and handle members 21 and 22. Mounted on the under side of the support frame 10 at the junction of the side members and the upwardly and rearwardly extending arm members are depending brackets 23 and 24 in which there is journaled the axle member 25 of the wheeled unit. The wheeled unit 11 also includes wheel members 26 and 27 mounted on the ends of the axle member 25 and sprocket members 28 and 29 mounted on the axle member 25 between the wheels 26 and 27 and the support frame 10.

As best illustrated in FIGURE 2, the grass bending member 12 consists of a substantially vertically disposed section 30, which is mounted on the front end of the support frame, a substantially horizontal section 31 having a flat bottom surface extending forwardly from the lower end of the vertical section 30, and a section 32 having a flat bottom surface extending upwardly and forwardly from the front edge of the horizontal section 31. The grass bending member 12 is adapted to be adjusted vertically relative to the support frame 10, to adjust the spacing between the bottom surface of section 31 and the working surface. This vertical adjustment is permitted by vertical slots 33 and 34 formed in the upper end of the vertical section 30 through which bolts 35 and 36 extend for securing the grass bending member to the front of the support frame.

The cutting assembly 13 is mounted rearwardly and adjacent the vertical section 30 of the grass bending member. This assembly consists of a transversely extending carrier member 37, being substantially coextensive with the bending member, having a vertically disposed, transversely extending detachable cutting blade 38 and a plurality of detachable cutting units 39 mounted immediately rearwardly thereof on the under side of the carrier member 37. As best illustrated in FIGURE 5, each of the cutting units 39 has a backing portion 40 adapted to be mounted against the under side of the carrier member 37 and a plurality of vertically disposed, longitudinally extending cutting blades 41 depending therefrom. Each of the cutting units 39 is mounted on the under side of the carrier member 37 by means of suitable bolts 42. Extending upwardly from the carrier member 37 are arm members 43 and 44 which are journaled in laterally projecting brackets 45 and 46, respectively, mounted on the side members of the support frame. The arm members 43 and 44 are adapted to move vertically within the bracket members 45 and 46.

The operating mechanisms 14, 14 are substantially similar in construction so that only the mechanism shown in FIGURE 2 will be described. This mechanism includes a lever member 47 pivotally mounted at an intermediate point on an upwardly extending bracket member 48 mounted on the side member 15 of the support frame and a spring 49 interconnecting the forward portion of the lever member and the side member 15 of the support frame, urging the lever member 47 in a clockwise direction. The forward end of the lever member 47 is provided with a depending bracket 50 which is received within a bifurcated member 51 mounted on the upper end of the arm member 44. The forward end of the lever member 47 is linked to the arm member 43 by means of a pin 52 extending through the ear portions of the member 51 and an elongated slot 53 in the depending bracket 50. Mounted on the rearward end of the lever 47 is a pawl member 54 which is engaged by the teeth 55 of the sprocket wheel 28 to transmit oscillating motion to the lever member 47 as the apparatus is moved forwardly and the sprocket wheel turns. The spring member 49 is adapted to urge the pawl member 54 into engagement with the under sides of the teeth of the sprocket member 28.

In the operation of the embodiment illustrated in FIGURES 1 through 5, the apparatus is moved forwardly so that the section 32 of the bending member 12 engages the grass and bends the blades of grass under the horizontal section 31. As the apparatus continues to move forwardly, the blades of grass are bent forwardly and maintained in a substantially horizontal position under section 31 of the bending member until they are reached by the transversely extending cutting blade 38 of the cutting assembly. As the sprocket 28 rotates with the forward movement of the apparatus, the lever members are caused to oscillate, thereby transmitting a vertically reciprocating motion to the arm members 43 and 44 and the carrier member 37 of the cutting assembly. The blade 38 thereby severs the blades of grass which are maintained in the bent position by the horizontal section 31 of the bending member. Those blades of grass which are orientated at an angle relative to the line of travel of the apparatus are cut by the longitudinally extending blades 41 of the cutting units 39.

The bending member 12 can be adjusted vertically, depending upon the nature of the grass being cut. In addition, the transversely extending blade 38 and the cutting units 39 may be removed and sharpened whenever the cutting blades thereof become dull.

Although a lever member, operatively interconnecting the wheeled unit and the cutting assembly for translating the rotary motion of the wheeled unit to the reciprocating motion of the cutting assembly, has been described above in connection with the embodiment illustrated in FIGURES 1 through 5, it will be understood that any means may be employed to reciprocate the cutting assembly. Furthermore, any configuration of cutting blades also may be employed with the cutting assembly which are adapted to cooperate with the grass bending member 12 to sever the blades of grass while they are held in the bent position.

Referring to FIGURES 6 through 8, there is illustrated another embodiment of the invention. This embodiment is substantially similar to the embodiment illustrated in FIGURES 1 through 5, except that an additional lateral movement is imparted to the carrier member of the cutting assembly. Referring to FIGURE 6, the carrier member 37a is provided on its upper side with transversely extending track members 56 and 57, which are carried on pairs of rollers 58 and 59 mounted on the lower ends of upwardly extending arm members 43a and 44a. Interconnecting the carrier member 37a and the front end member 17a of the support frame is a linking member 60, pivotally connected at its upper end to the front end member 17a and at its lower end to the upwardly extending bracket member 61 mounted on the upper side of the carrier member 37a. It will be seen that as the arm members 43a and 44a are reciprocated vertically, the linking member 60 will cause the carrier member 37a to move laterally. The connections of the arm members 43a and 44a with the carrier member 37a will permit transverse movement of the carrier member 37a relative to the arm members as a result of the roller and track connections. Aside from the lateral motion imparted on the carrier member 37a, the embodiment illustrated in FIGURES 6 through 8 operates in substantially the same manner as described in connection with the embodiment illustrated in FIGURES 1 through 5.

From the foregoing detailed description it will be evident that there are a number of changes, adaptations and modifications of the present invention which come within the province of those skilled in the art. However, it is intended that all such variations not departing from the spirit of the invention be considered as within the scope thereof as limited solely by the appended claims.

What I claim is:

1. An apparatus for cutting grass along the earth surface comprising a movable support means, grass bending means mounted on said support means engageable with the blades of grass for bending the blades, said grass bending means including an elongated transversely extending element having a flat bottom surface closely spaced from the earth surface, substantially vertically reciprocable and transversely extending cutting means including an elongated transversely extending cutting bar means mounted on said support means closely adjacent said bending means and drive means for reciprocating said cutting bar in a vertical direction for cutting said blades bent by said bending means.

2. An apparatus for cutting grass according to claim 1, including means for imparting a lateral movement to said cutting means.

3. An apparatus for cutting grass along the earth surface comprising a movable support means, means mounted on said support means engageable with the blades of grass for bending the blades, said bending means including a transversely extending, substantially horizontal planar bottom surface being spaced from said earth surface and an adjoining transversely extending planar surface inclined upwardly from said horizontal surface, substantially vertically reciprocable means mounted on said support means closely adjacent said horizontal surface for cutting said bent blades of grass and means for reciprocating said cutting means in a vertical direction.

4. An apparatus for cutting grass according to claim 3, including means for imparting a lateral movement to said cutting means.

5. An apparatus for cutting grass comprising a movable support means, means vertically adjustably mounted on said support means engageable with the blades of grass for bending the blades, said bending means including a transversely extending substantially horizontal planar bottom surface and an adjoining transversely extending planar surface inclined upwardly from said horizontal surface, a transversely extending carrier member mounted on said support means adjacent said bending means for substantially vertical movement, a transversely extending blade mounted on said carrier member, engageable with said bent blades of grass, at least one cutting unit mounted on said carrier member, said cutting unit including a plurality of transversely spaced cutting blades positioned at spaced intervals along said transversely extending carrier member and oriented substantially perpendicularly to said transversely extending blade and means for reciprocating said carrier member.

6. An apparatus for cutting grass according to claim 5, including means for imparting a lateral movement to said carrier member.

7. An apparatus for cutting grass comprising a wheeled unit, a frame member mounted on said wheeled unit, means mounted on said frame member engageable with the blades of grass for bending the blades, substantially vertically reciprocable means mounted on said frame member adjacent said bending means for cutting said blades bent by said bending means, a lever member pivotally mounted on said frame member having a portion thereof operatively interconnecting said wheeled unit and said cutting means for translating rotary drive of said wheeled unit to oscillating movement of said cutting means and means for imparting a lateral movement to said cutting means.

8. An apparatus for cutting grass comprising a wheeled unit, a frame member mounted on said wheeled unit, means mounted on said frame member engageable with the blades of grass for bending the blades, said bending means including a transversely extending substantially horizontal bottom surface and an adjoining transversely extending surface inclined upwardly from said horizontal surface, a transversely extending carrier member mounted on said frame member adjacent said bending means for substantially vertical movement, a transversely extending blade mounted on said carrier member engageable with said bent blades of grass, at least one cutting unit mounted on said carrier member, said cutting unit including a plurality of transversely spaced, longitudinally extending blades, said carrier member being connected to said frame member by means of an upwardly extending arm member mounted on said frame member for substantially vertical movement, at least one lever member mounted on said frame member, said lever member having a pawl member mounted on one end thereof operatively engageable with a sprocket wheel mounted on said wheeled unit for translating rotary motion of the wheeled unit to oscillating motion of the lever member and the opposite end of said lever member being operatively connected to said upwardly extending arm member for transmitting oscillating motion to said carrier member.

9. An apparatus for cutting grass according to claim 8, wherein the carrier member is connected to the upwardly extending arm member to permit lateral movement of the carrier member independent of said arm member and including linking means pivotally interconnecting said carrier member to said frame member cooperable with said lever member in imparting a lateral movement to said carrier member when said carrier member is oscillated vertically.

References Cited
UNITED STATES PATENTS

| | | | |
|---|---|---|---|
| 270,994 | 1/1883 | Springer | 172—31 |
| 964,631 | 7/1910 | Felker | 56—260 |
| 1,732,972 | 10/1929 | Knipfing | 172—20 |
| 2,716,317 | 8/1955 | McClellan | 56—1 |
| 3,224,177 | 12/1965 | Adee | 56—23 |

ABRAHAM G. STONE, *Primary Examiner.*

P. RAZZANO, *Assistant Examiner.*